(12) United States Patent  (10) Patent No.: US 7,515,285 B2
Watanabe  (45) Date of Patent: Apr. 7, 2009

(54) METHOD AND APPARATUS FOR IMAGE PROCESSING

(75) Inventor: Koichi Watanabe, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 612 days.

(21) Appl. No.: 11/234,140

(22) Filed: Sep. 26, 2005

(65) Prior Publication Data

US 2007/0071293 A1    Mar. 29, 2007

(51) Int. Cl.
 *G06F 3/12*  (2006.01)
(52) U.S. Cl. ..................... 358/1.13; 358/1.15
(58) Field of Classification Search .................. 358/1.1, 358/1.13, 1.16, 1.17, 1.18, 1.9, 2.1, 450, 358/453; 382/128
See application file for complete search history.

(56) References Cited

U.S. PATENT DOCUMENTS

| | | | | |
|---|---|---|---|---|
| 5,319,748 A | * | 6/1994 | Motoyama | ................. 345/501 |
| 5,805,174 A | * | 9/1998 | Ramchandran | ............. 345/501 |
| 6,301,010 B1 | * | 10/2001 | Kajita | ....................... 358/1.13 |
| 6,894,794 B1 | * | 5/2005 | Patton et al. | ............... 358/1.15 |
| 7,103,833 B1 | * | 9/2006 | Sano et al. | ................... 715/206 |
| 7,432,953 B2 | * | 10/2008 | Washisu | .................. 348/208.5 |
| 2004/0234134 A1 | * | 11/2004 | Fuchigami | .................. 382/199 |

FOREIGN PATENT DOCUMENTS

JP    11-215272 A    8/1999

* cited by examiner

*Primary Examiner*—James A Thompson
(74) *Attorney, Agent, or Firm*—Foley & Lardner LLP

(57) ABSTRACT

The present invention relates to apparatus and method, which are capable of achieving free layout editing/printout in a state of mixing image data having different format in the same page. Specifically, predetermined (different/same) image processing using block data as a unit is carried out according to the result of reading attribute information added to input block data. The processed block data is converted into a format printable out on the same page.

12 Claims, 10 Drawing Sheets

| How to read block image data from image memory | Non-rotation | Right 90° rotation | 180° rotation | Left 90° rotation |
|---|---|---|---|---|
| Content of image memory | F | F | F | F |
| Print image | F | F | F | F |

FIG. 9

METHOD AND APPARATUS FOR IMAGE PROCESSING

BACKGROUND OF THE INVENTION

1. Field of the Invention

The present invention relates to method and apparatus for image processing, which can achieve image processing adaptable to an image output device with respect to an output object image containing image data having several attributes in one image output (one page), for example, display, storage and printout, with high reproduction regardless of attributes of individual image data.

2. Description of the Related Art

JPN. PAT. APPLN. KOKAI Publication No. 11-215272 discloses the following technique in a digital multi-function printer. According to the technique, header information is added to each image data of the following image processings. One is image processing of a scanner input image captured by a scanner for copy and expansion to image memory. Another is image processing of a fax image (received using a facsimile function) and expansion to image memory. Another is image processing of an image having a print instruction (printout) from a host computer and expansion to image memory.

The foregoing Publication has the following description. According to the description, header information is added to each (mutually different) image data, and thereby, even if image data is concurrently input, processing is effectively performed, and the device configuration is simplified.

There have been known apparatus and method for image processing, which are able to handle different image data such as copy, fax and printer disclosed in the foregoing Publication. According to the image processing, in an image processing circuit, proper image processing is subjected to each of different image data in accordance with the kind of image data. The image data is converted into a single image format, and thereafter, stored in individual image data areas of an image memory. Then, the content stored in the image memory is output to a printer unit.

However, the foregoing apparatus and method for image processing disclosed in the Publication has the following problem. That is, the kind of the initial image of the image data stored in the image memory is not reflected (i.e., image data is stored in the single image format in the image memory, but the kind of the initial image is not classified).

Different kinds of images are allocated and/or edited to the same page area of the image memory using the processing configuration disclosed in the foregoing Publication. In this case, image data must be handled as multi-level data to improve image quality (to preferentially consider image quality, that is, realize high image quality). Moreover, non-compression image data outputable directly to a printer unit is required as a common image format. However, it is a matter of course that the image memory capacity required for editing image data per unit page becomes huge. As a result, the apparatus becomes large scale; therefore, the cost increases.

On the other hand, if the image is compressed to reduce the image memory capacity, there is a need of using a common format in the image memory. For this reason, it is difficult to employ different compression methods suitable to image characteristics of copy and printer; therefore, the compression method must be unified into one of those. Unless a compression method suitable to any one of those is used, a compression method common to each attribute of image data is employed as a compromise proposal. By doing so, the image memory capacity is reduced, but there is a problem that the image quality is reduced. In this case, since coding conversion is required, a processing mechanism for coding conversion must be newly added. As a result, the apparatus becomes large scale; therefore, the cost increases.

BRIEF SUMMARY OF THE INVENTION

An object of the present invention is to provide method and apparatus image processing (and image forming apparatus), which can allocate and/or edit image data having different attribute to the same page area of an image memory, and perform image processing suitable to a high-quality image output device.

Specifically, there is provided an image forming apparatus, which can allocate and edit an image in an image memory, output it as printout, or display it on a display unit, or store image data in an external storage device. More specifically, there is provided apparatus and method for image processing, which can mix image data having different characteristics (image format) such as copy image, printer image, fax reception data or data captured by scanner while maintaining each image data characteristic each, and can perform display, storage or printout.

According to one aspect of the present invention, there is provided an image processing apparatus comprising:

first input means for inputting a first image data;

second input means for inputting a second image data;

adding means for adding attribute data showing an attribute to each of the input first and second image data;

storage means for storing the first and second image data to which the attribute data is added;

read means for reading the first and second image data stored in the storage means and added with the attribute data;

analysis means for analyzing each attribute of the first and second image data based on each attribute data of the first and second image data read by the read means; and image processing means for carrying out first image processing with respect to the first image data read by the read means while carrying out second image processing with respect to the second image data read by the read means in accordance with the analyzed each attribute.

According to one aspect of the present invention, there is provided an image processing method comprising:

specifying an image processing unit corresponding to an image format according to image attribute information contained in a block data;

inputting the corresponding block data to the specified image processing unit; and converting the block data into an image output device format.

According to one aspect of the present invention, there is provided an image forming apparatus comprising:

a first image processing unit processing an image according to a predetermined image format, the image format being added as attribute information to a block data using arbitrary pixels as a unit;

a second image processing unit processing an image according to a predetermined image format, the image format being given as attribute information to a block data using arbitrary pixels as a unit;

an image attribute information identifying unit reading the attribute information given to the input block data, and sorting it into any one of the first or second image processing; and an image data synthesis unit converting block data processed by each image processing unit into an image output device format.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a schematic view to explain the printout flow of changing the sequence of calling a block image from an image memory to rotate an image and to form (print) an output image;

DETAILED DESCRIPTION OF THE INVENTION

An embodiment of the present invention will be described below with reference to the accompanying drawings.

[Explanation of the Configuration]

Figure 1:
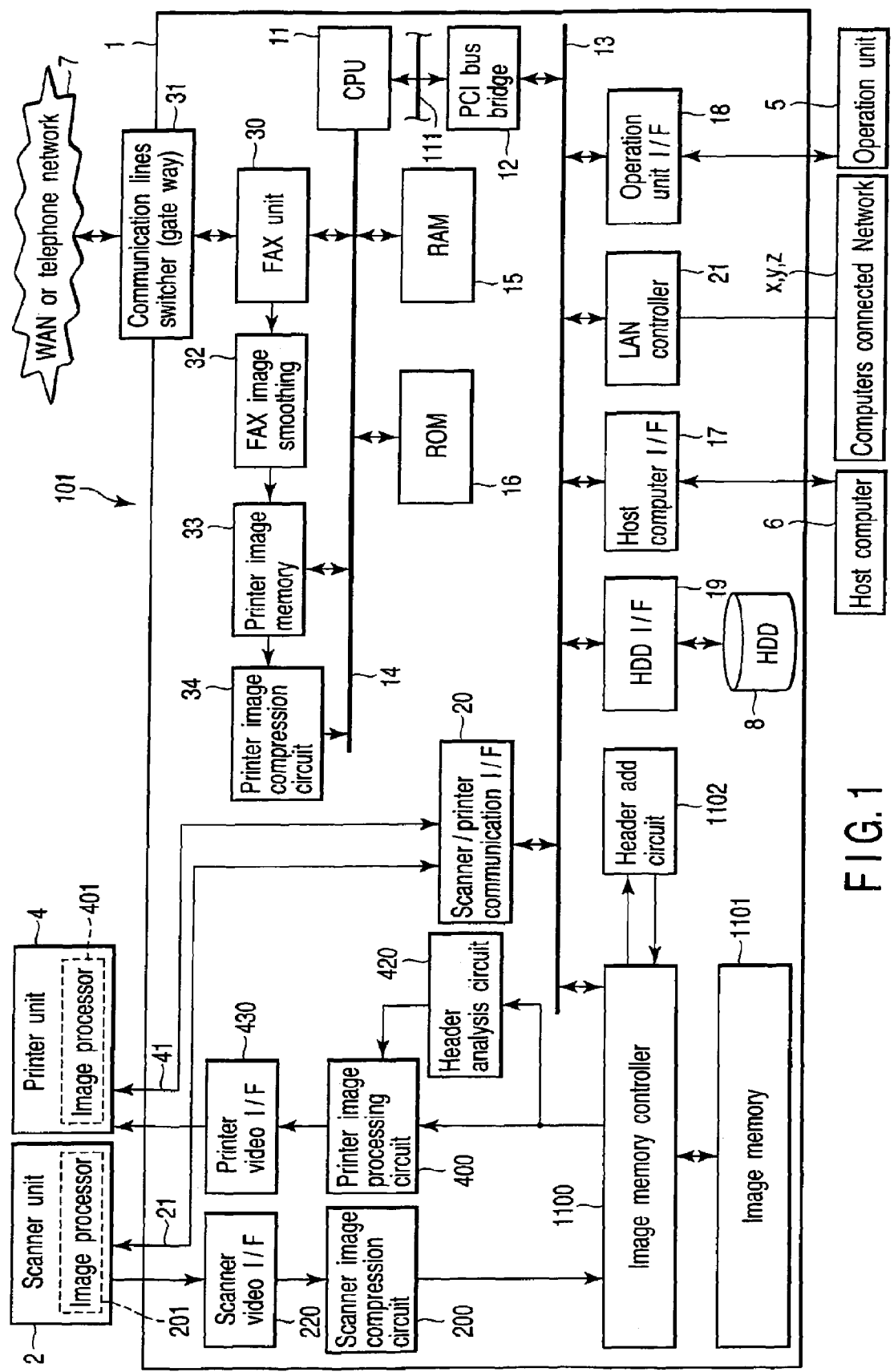
FIG. 1 is a schematic block diagram showing the configuration of a digital multi-function printer (image forming apparatus) to which the present invention is applicable.

FIG. 1 shows the circuit configuration of an image processing apparatus according to an embodiment of the present invention.

As shown in FIG. 1, a digital multi-function peripheral, that is, image forming apparatus 101 includes system controller 1, image input unit (scanner unit) 2, printer unit 4, and operation unit 5. Specifically, the system controller 1 controls the whole of the system. The image input unit (scanner unit) 2 scans a document while radiating light to it using a light source, and reads a reflection light from the document, that is, an image using a color CCD sensor. The printer unit 4 modulates a light emitted from a LD (laser diode) to print out an image. The operation unit 5 displays operation setting instructions to the image forming apparatus 101 from user, setting operation contents and operation state, and makes an interactive operation with user.

The scanner unit (image input unit) 2 has an image processor 21, which is able to execute the following various processings, although detailedly described. The processings include γ correction for image reader, color conversion, main scanning multiply, image separation, processing, area processing, and gradation correction.

The printer unit (printout unit) 4 has a printer image processor 41, which is able to execute various processings such as γ correction for printout, printout color correction, image synthesis, processing, and gradation correction, although detailedly described.

The operation unit (instruction input/display unit) 5 includes touch panel sensor, graphical display, dedicated buttons (input keys) such as start/cancel used with high frequency, and status display LED, although detailedly described. The touch panel sensor is used for operation (on/off) instruction by user, mode select (select instruction), numerical input or function select (select input). The graphical display displays a response screen to display or select input corresponding to the instruction by the touch panel sensor. The dedicated buttons (input keys) input (deposit) numerals such as the number of copy (printout) sheets.

The foregoing scanner unit 2, printer unit 4 and operation unit 5 are connected to a PCI bus 13 via each interface provided correspondingly to them, that is, scanner/printer communication interface 20 and operation unit interface 18.

The PCI bus 13 is connected with a CPU (main controller) 11 via a PCI bus bridge 12. The CPU 11 is connected with a CPU local bus 14 to mutually make a connection with RAM 15 and ROM 16. The RAM 15 is used as program memory for processings executed by the CPU 11 and data storage area. The ROM 16 is used as an area storing boot program required for system boot-up, programs for realizing various functions by the CPU 11, and fixed data. The program data on the ROM 16 is held in the ROM 16 as compression data; in this case, the program data may be executed after being expanded to the RAM 15.

The PCI bus 13 is connected with an external apparatus, for example, host computer 6 via a host computer interface 17. Moreover, the PCI bus 13 is connected with a HDD (hard disk drive) 8 capable of holding large capacity data via a HDD (hard disk drive) interface 19. In addition, the PCI bus 13 is connected with arbitrary computer, other multi-function peripherals (MFPs) x, y, and z, which exist on a network.

The host computer interface 17 is a public-known interface such as Ethernet, Universal Serial Bus (USB), IEEE 1284 and IEEE 1394, and makes communications with apparatus outside (external device), that is, host computer 6. The digital multi-function peripheral 101 can make fax communications using WAN or telephone network 7 connectable via a communication lines switcher (gateway) 31 from a fax unit 30 connected to the CPU local bus 14. Incidentally, the digital multi-function peripheral 101 can make communications with arbitrary computers connected to the LAN controller 21 and other MFPs.

[Explanation of System Controller 1]

The function of the system controller 1 will be described below in detail.

The system controller 1 makes a control signal exchange with scanner 2 and printer 4 connected via the scanner/printer communication interface 20. By doing so, the system controller 1 controls the operation of the scanner 2 to read color or monochrome (black and white) image data while controlling the printer 4 to print out color or monochrome image data.

The image data thus read is temporarily stored in an image memory 1101, and thereby, the following operations are possible. Specifically, one is repeat output of the required sheet of images by only one-time document image reading (several-sheet output). Another is N in 1-output of reducing and arranging images of several pages on one paper. Another is image rotation performing arbitrary gathering of the document image at a unit of 90°. Another is form synthesis of forming a document frame in the read image or synthesis of date, logo mark(s) and/or water mark(s).

The read image data is compressed by coding in an image processor 201 or image memory controller 1100 as the need arises. By doing so, an amount of data held in the HDD 8 is reduced. In addition, the foregoing compression is carried out, and thereby, a large amount of image data is storable in the HDD 8. The image data temporarily stored in the HDD 8 is output according to arbitrary sequence and arbitrary number of times. By doing so, printout of required arbitrary sheets (number of sheets) calling electronic sort is possible.

Moreover, the digital multi-function peripheral (MFP) 101 receives a print instruction from peripheral (external) apparatus connected via the following various connections, and then, generates image data for printout to print it out. One of the foregoing connections is local connection such as IEEE 1284, IEEE 1394 and USB (connection via the host computer interface 17). Another is LAN connection via the LAN controller 21. Another is connection to telephone network or WAN (Wide Area Network) 7 via the gateway 31 connected to the fax unit (modem) 30.

Therefore, the digital multi-function peripheral 101 is usable as a color printer, which performs printout corresponding to the supplied printout image data, and as a color scanner, which transfers the read image to connected apparatus. In addition, the digital multi-function peripheral 101 transmits/receives image data containing characters as fax, and transmits/receives an image as an electronic mail.

The digital multi-function peripheral 101 temporarily stores several print job supplied externally and image read by the scanner in the HDD 8, and thereby, reforms several documents as one document, and then, prints it out.

The configuration of the system controller 1 will be described below in detail.

The CPU 11 is a controller, which controls the whole of the system. Specifically, the CPU 11 controls the following processings required for the digital multi-function peripheral (image forming apparatus) 101. One of the foregoing processings is application processing such as copy function, printer function, scanner function, fax transmission/reception function and E-mail transmission/reception function. Another is UI (User Interface) processing and communication control with apparatus connected to local network. Another is data processing such as image data format conversion for inputting and outputting image data and coding.

The CPU local bus 14 is a bus for connecting ROM 16, PAM 15 and other peripheral devices to the CPU 11.

The fax unit 30 is a modulator-demodulator (modem) for communication data input and output via WAN or telephone network 7 connected via the gateway 31 such as PSTN and ISDN. The fax unit 30 makes possible fax transmission/reception, remote connection by telephone line, and connection to Internet by ISP connection.

A host bus 111 of the CPU 11 is connected with the PCI bus 13 via the PCI bus bridge 13, as described before. Thus, data transfer is possible between the CPU 11 and devices existing on local bus 14 and PCI bus 13. Incidentally, there is the case where the host bus and the local bus are the same depending on the kind of the CPU, or the case where the PCI bus bridge is built in the CPU.

According to this embodiment, the PCI bus 13 is employed, and thereby, it is possible to realize high-speed data transfer is realized without depending on the kind of the CPU, and to use existing devices conformable to the PCI bus standards.

An image memory controller 1100 controls a large-capacity image memory 1101, which is capable of storing code data of non-compression and compressed images. The image memory controller 1100 controls image data read from scanner to image memory and image data printout from image memory to printer.

The foregoing image memory controller 1100 can handle image data having various formats. Specifically, the controller 1100 can handle monochrome and color images as a binary image, monochrome and color image data of copy and network printer functions as a multi-level image. Therefore, the controller 110 selects the optimum compression in accordance with using functions.

A header add-on circuit 1102 connected to the image memory controller 1100 is used for expanding image data having various formats such as copy and print to the image memory 1101. In this case, the header add-on circuit 1102 adds on header information showing image attribute to image data dividing an image into rectangular block units.

The add-on circuit 1102 further expands block image data containing header to the image memory 1101 as fixed-size data. By doing so, block unit allocation and 90° rotation processing are readily achieved in a state of keeping a two-dimensional page layout.

Page-edited image data for print is successively read from the image memory as block image every block. In this case, a header analysis circuit 420 specifies the kind of the read block image.

A printer image processing unit 400 executes decompression and image processing of the compressed image based on the determined result from the header analysis circuit 420. Then, the printer image processor 400 converts the image into a common image format required for the printer unit 4, and thereafter, outputs it to the printer unit 4 via a printer video interface 430. The printer image processing circuit 400 is capable of coding or decoding image data on the image memory 1101. Reversible variable-length coding (standard) is used as the foregoing coding/decoding.

The CPU 11 makes control of the image memory controller 110 and makes an access to the image memory 1101 via the PCI bus 13. Likewise, other devices connected to the PCI bus 13 make an access to the image memory 1101. By doing so, the CPU 11 can achieve high-speed data transfer with HDD 8 and external input/output interface such as host computer interface 17 and LAN controller 21.

Image data read (scanned) by the scanner 2 is input to a scanner image compression circuit 200 via a scanner video interface 220, and then, compressed by the scanner image compression circuit 200. Thereafter, the image data is stored in the image memory 1101 via the image memory controller 1100.

The scanner/printer communication interface 20 makes an exchange of control information such as command and status between scanner 2 and printer 4 via serial communication 21 (for scanner) and serial communication 41 (for printer). By doing so, the CPU 11 can acquire various informations, that is, boot or operating state of apparatus, read document size or kind, paper size designation, and residual amount of paper or consumption articles (toner, etc.).

A HDD interface 19 controls the HDD 8 using IDE and SCSI, and makes a high-speed data transfer with the RAM 15 on the CPU local bus 14 and the image memory 1101 on the PCI bus 13.

The host computer interface 17 mutually connects PC (personal computer) using local connection interface such as USB, IEEE 1284 and IEEE 1394 and network interface such as Ethernet.

The operation unit interface 18 makes the CPU 11 possible to control the operation unit 5 via the PCI bus 13. In other words, user can makes predetermined operation instructions and numerical input (setting) with respect to the digital multifunction peripheral 101 using the operation unit 5. The CPU 11 or display control unit (not described in detail) displays setup contents or operating states.

DETAILED DESCRIPTION OF THE INVENTION

The present invention, that is, method and apparatus for image processing having the following features will be explained below in detail. According to the features, image data having different format, such as copy image and print image, are freely laid out and edited in a state of being mixed on the same page without reducing image characteristic. In the following description, the foregoing features, "image data having different format are freely laid out and edited in a state of being mixed on the same page without reducing image characteristic" calls "page edit". The page edit of the present invention described later is used, and thereby, it is possible to obtain an image processing method, which does not increase image memory capacity required for the "page edit", and to an image processing apparatus realizing the method.

Figure 2:
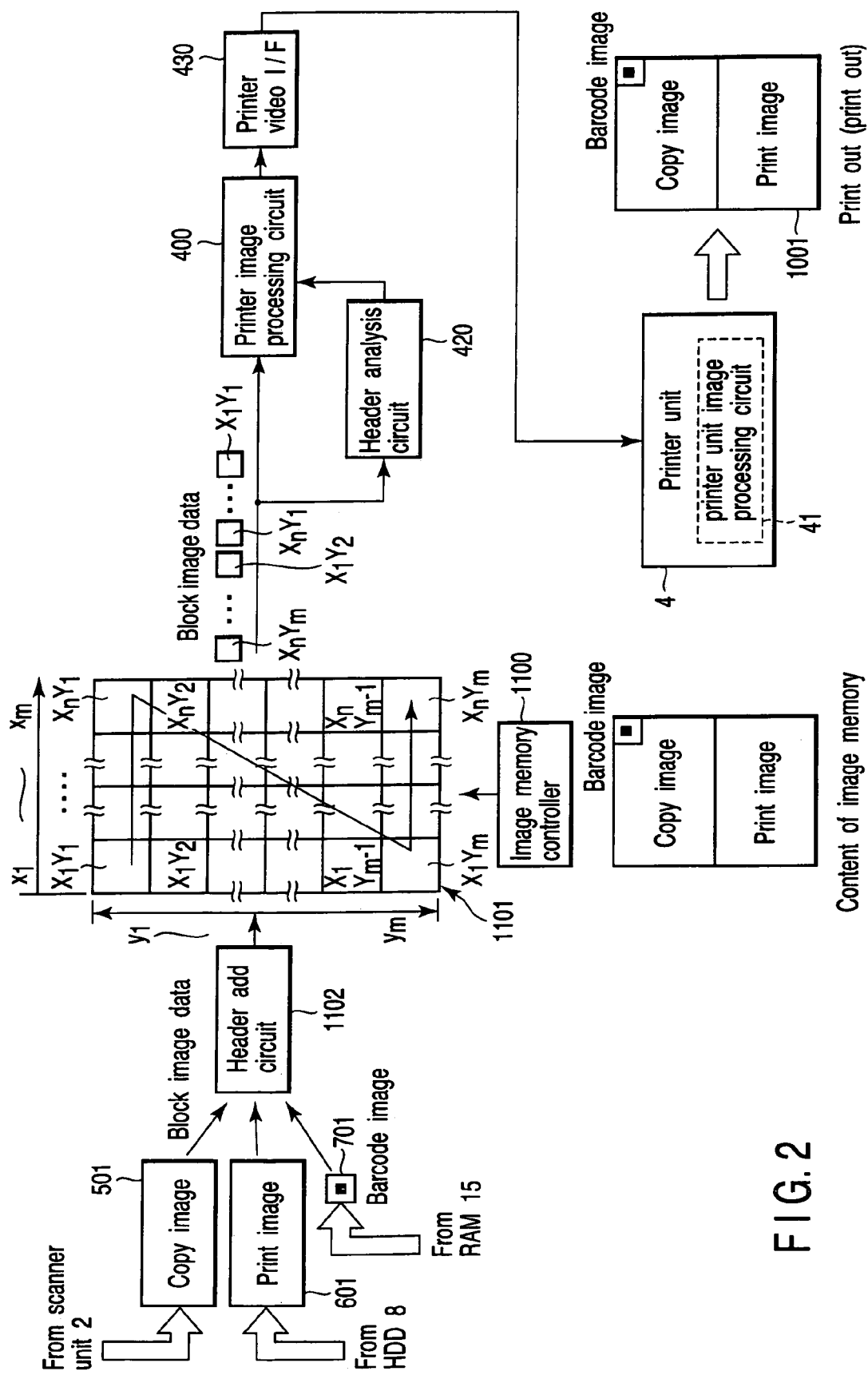
FIG. 2 is a view to explain the flow of page-editing and printing out image data having different formats applied to the digital multi-function printer shown in FIG. 1.

FIG. 2 shows an image data processing flow until printout to printer is made in the features of the present invention, that is, page edit.

The following images are given as a page edit target as shown in FIG. 2. One is a copy image reading paper documents (printed or book) from scanner. Another is a print image having a print instruction from application of the host computer. Another is a barcode image for outputting additional information onto the same page as the copy image or print image. In this case, the additional information includes date and creator name as printout (print image) or individual ID on printed. Of course, any of print image or copy image may be given as a fax image received from the fax unit 30 (see FIG. 1).

In FIG. 2, a copy image 501 has full color information separated into C (Cyan), M (Magenta) and Y (Yellow). For example, the copy image 501 is separated into a block using 8×8 pixel as a unit, and subjected to proper compression (effective in the copy image 501) at a unit of block.

In FIG. 2, a print image 601 has full color information represented by print color adding K (black) to C, M and Y. For example, the copy image 501 is separated into a block using 8×8 pixel as a unit, and subjected to proper compression (effective in the print image 601) at a unit of block.

In FIG. 2, a barcode image 701 is a binary monochrome image, and only separated into a block using 8×8 pixel as a unit. In many cases, the barcode image 701 is not subject to compression (i.e., non-compression data).

The block division number is arbitrarily set so long as the foregoing copy, print and barcode images 501, 601 and 701 each have the same number of blocks and one block size (unit block) is the same. In this case, if the block division number is increased, a degree of freedom of page edit is improved. On the other hand, if the block division number is decreased, the number of images (copy, print and barcode images 501, 601 and 701) allocated to individual blocks is limited. For this reason, the degree of freedom of page edit is reduced.

In many cases, the foregoing images (copy, print and barcode images 501, 601 and 701) are temporarily stored in the HDD 8 (see FIG. 1), and thereafter, used for page edit. Thus, the images are coded using variable-length coding having high compression efficiency.

In FIG. 2, block images (8×8 X1 to Xn, Y1 to Ym, n=m=8, "(block name) X1Y1" to "(block name) XnYm" are given. The header add-on circuit 1102 adds the kind of each image to each block image as attribute information. The block images are arbitrarily arranged in its position and sequence on the image memory 1101 at a unit of block (according to the control by the image memory controller 1100).

Even if the data format of individual block images is variable-length data, the header add-on circuit 1102 adds invalid data, and thereby, each block image has fixed-length data. Or, the start position of storing the block image to the image memory 1101 is skipped according to the control by the image memory controller 1100, and thereby, each block image is arranged having a fixed size. Of course, block image data added with attribute information is writable directly to the image memory 1101 according to the control by the CPU 11 (see FIG. 1).

When page edit ends, individual block images arranged on the image memory 1101 in a predetermined sequence are successively read at a unit of block by the image memory controller 1100.

Attribute data added to the read block image data is analyzed by the header analysis circuit 420. According to the analyzed header information, that is, attribute data, the printer image processing circuit 400 executes decompression and image processing in accordance with image data of the input block image data. In this case, the printer unit 4 converts the block image data into printable common image data.

For example, as illustrated in FIG. 9, the sequence of reading individual block image data from the image memory 1101 is changed. By doing so, the content stored in the image memory 1101 is output while being rotated at a unit of 90°. For example, in non-rotation, block image data stored in the image memory 1101 is read in the sequence of X1Y1, X2Y1, . . . , XnY1, X1Y2, X2Y2, . . . , XnY2, . . . , X1Ym−1, X2Ym−1, . . . , XnYm−1, X1Ym, X2Ym, . . . , XnYm. In right 90° rotation, block image data stored in the image memory 1101 is read in the sequence of X1Ym, X1Ym−1, . . . , X1Y1, X2Ym, X2Ym−1, . . . , X2Y1, . . . , XnYm, XnYm−1, . . . , XnY1. Likewise, in 180° rotation, block image data stored in the image memory 1101 is read in the sequence of XnYm, Xn−1Ym, . . . , X1Ym, XnYm−1, X1Ym−1, . . . , XnY2, . . . , X1Y2, XnY1, . . . , X1Y1. In left 90° rotation, block image data stored in the image memory 1101 is read in the sequence of XnY1, XnY2, . . . , XnYm−1, XnYm, Xn−1Y1, . . . , Xn−1Ym, . . . , X1Y1, X1Y2, . . . , X1Ym−1, X1Ym.

As described above, block image data divided into a predetermined number has a fixed-length data size, and the sequence of reading block image data is specified using the image memory controller 110. By doing so, printout image is rotated to an arbitrary direction (at a unit of 90°). Of course, if there is no need of rotating the printout image, the data size of each block image is set as variable length to dynamically secure an image memory size per page. By doing so, the available efficiency of the image memory 1101 is improved.

Figure 3:
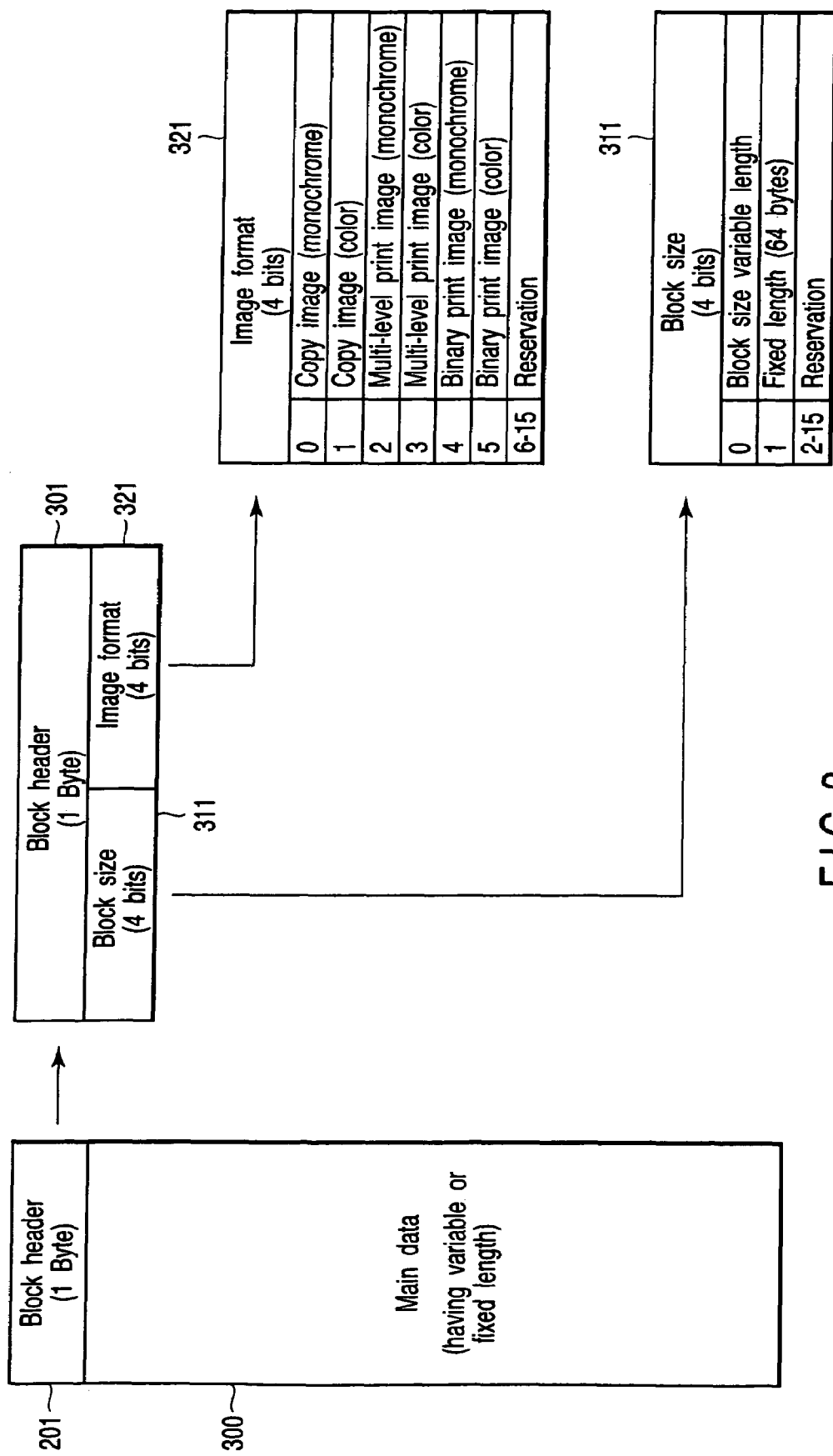
FIG. 3 is a schematic view to explain the block image data structure on an image memory.

FIG. 3 shows the structure of block image data on the image memory.

Block image data held in the image memory 1101 (see FIG. 1 or 2) is composed of a block header 301 added by the header add-on circuit 1102 (see FIG. 1 or 2) and initial image data, that is, main data 300.

The block data 301 includes block size field 311 and image format field 321. If the block image data has variable or fixed length, an index value showing a size corresponding to the length is described in the block size filed 311. An image format of the main data is described in the image format field 321.

According to the example of the present invention shown in FIG. 3, the block size is set to a 64 (byte) fixed length to achieve rotation print processing. Moreover, copy image (color) and multi-level print image (color) are used as the image format, and binary print image (monochrome) used as the barcode image.

If the block image data has no 8×8 pixel image information, that is, is less than 64 (byte), data having no special meaning is padded to obtain 64 (byte) fixed-length data, and thereafter, the block image data is arranged on the image memory 1101.

Figure 4:
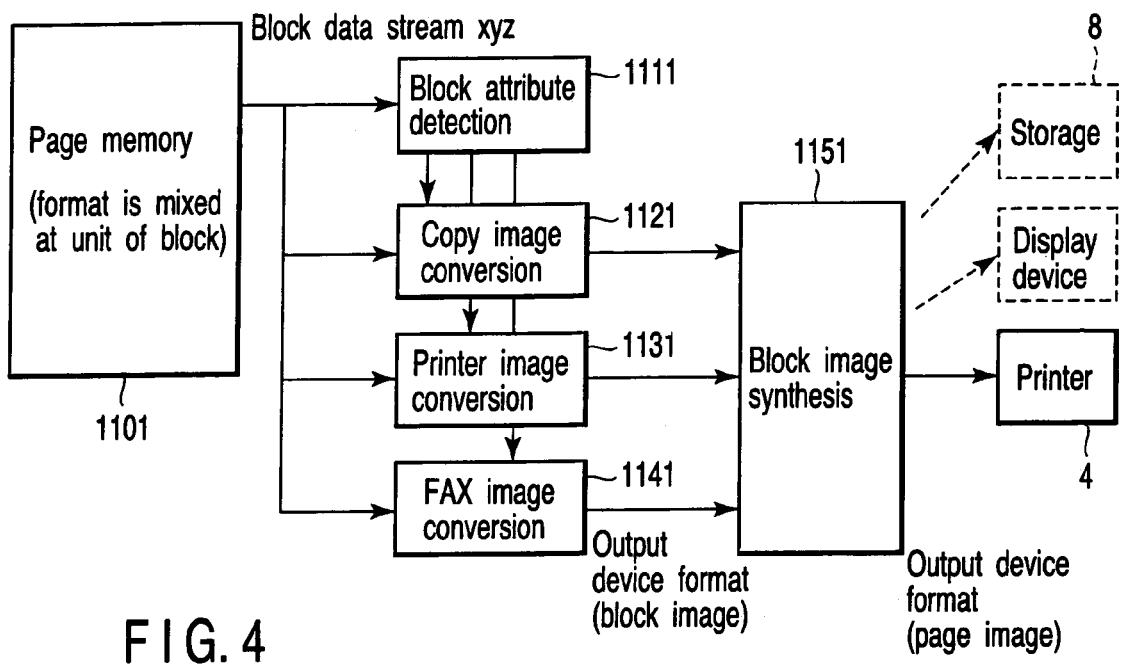
FIG. 4 is a schematic view to explain the concept of the image processing flow adaptable to an image output device when page-editing, displaying, storing (storage) or printing out image data having different formats shown in FIG. 2.

FIG. 4 is a schematic view to explain the flow of processing stream on a page memory (image memory) in which image data having different format are mixed at a unit of block described before using FIG. 2.

In the page memory (image memory) 1101, image data having different format are mixed and arranged at a unit of block as shown in FIG. 2. In this case, each image data (block image data), that is, block data stream xyz is supplied to a block attribute detector 1111. The block attribute detector 1111 specifies an image converter (image processing unit) corresponding to the format of the image according to image attribute information contained in block data (see FIG. 3). In this manner, an image processing unit corresponding to the block data attribute is specified. In other words, the block attribute detector 1111 identifies the block header 301 shown in FIG. 3. By doing so, image data is sorted into any of copy image converter 1121, printer image converter 1131 and fax image converter 1141, which can process the image data having the attribute described in the block header.

For example, the copy image converter 1121 decomposes image data compressed according to compression for copy image to converts it into a format (block image), which can be output as printout by (printer unit 4). Incidentally, the copy image converter 1121 is usable as at least one of CPU 11 and image memory controller 1100 in the multi-functional peripheral 101 shown in FIG. 1. Of course, either of the foregoing CPU 11 and image memory controller 1100 may be a firmware. The RAM 15 or areas secured in the HDD 8 is usable as a work (memory) area of control program (application). The application is stored in an application storage area of the HDD 8, and rewritable (version up is possible) at arbitrary timing.

For example, the printer image converter 1131 decomposes image data compressed according to compression for printer image to converts it into a format (block image), which can be output as printout by (printer unit 4). Incidentally, the printer image converter 1131 is usable as at least one of CPU 11 and image memory controller 1100 in the multi-functional peripheral 101 shown in FIG. 1. Of course, either of the foregoing CPU 11 and image memory controller 1100 may be a firmware. The RAM 15 or areas secured in the HDD 8 is usable as a work (memory) area of control program (application). The application is stored in an application storage area of the HDD 8, and rewritable (version up is possible) at arbitrary timing.

For example, the fax image converter 1141 converts non-compression image data for fax machine into a format (block image), which can be output as printout by (printer unit 4). Incidentally, the fax image converter 1141 corresponds to fax unit 30 connected to the CPU 11 via the local bus 14, fax image smoothing unit 32, printer image memory 33 and printer image compression circuit 34 in the multi-functional peripheral 101 shown in FIG. 1.

Based on information of the block header 301 identified by the block attribute detector 1111, the following image processing is carried out. Specifically, block image data decompressed by the copy image converter 1121 processing the corresponding attribute image data or by the printer image converter 1131 and block image data output from the fax image converter 1141 are synthesized. In this case, the block image data are synthesized on page memory (part of image memory 1101 is usable) for printout by the printer unit 4 so that the printer unit 5 can print it out. Thereafter, the block image data is expanded to raster data, and held until print start is instructed (block image synthesis unit 1151). The synthesized image data may be stored in the HDD 8 in place of printout by the printer unit 4, or may be displayed on a display unit (not shown) prepared as an external device.

Figure 5:
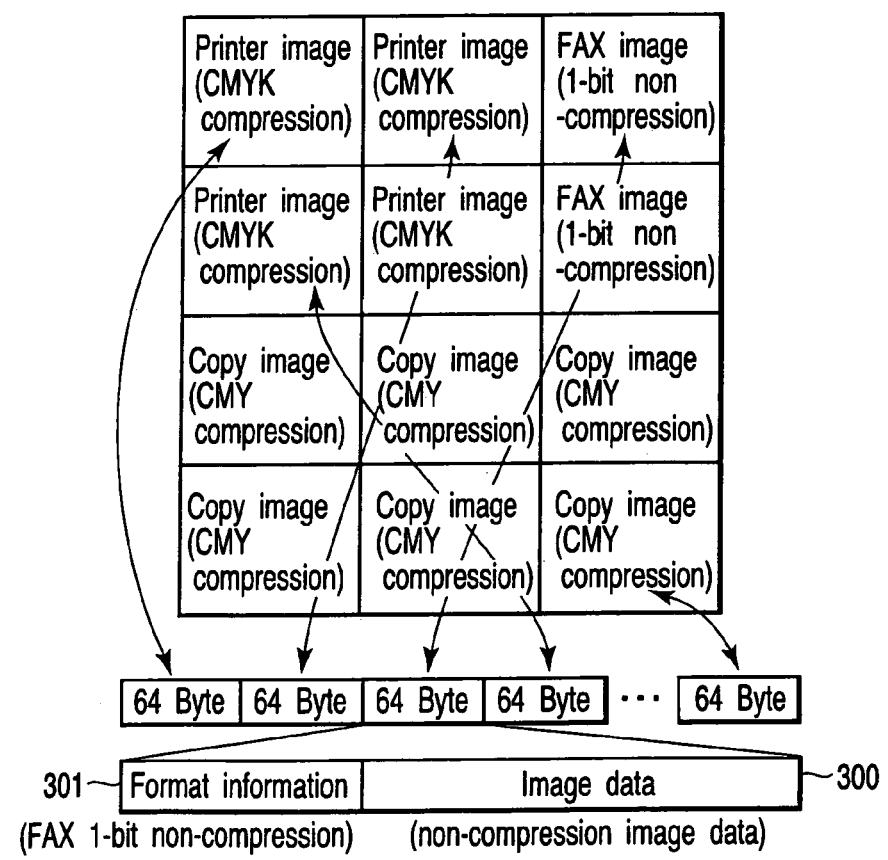
FIG. 5 is a schematic view to explain the concept of rearranging block image data on image memory shown in FIGS. 2 and 4.

FIG. 5 is a schematic view to explain the block image synthesis concept described in FIGS. 2 and 4.

As depicted in FIG. 5, image data equivalent to printout one page has a data length, for example, fixed length of 64 (byte). Image data divided into several (blocks) using 8×8 pixel as a unit (corresponding to "X1Y1, . . . , XnYm" on image memory 1101 in FIG. 2) are each supplied to the block attribute detector 1111 shown in FIG. 4 as a block data stream. The data array makes possible image processing (selective decompression) by any of copy image converter 1121, printer image converter 1131 and fax image converter 1141, which can process image data having attribute described in the block header, as described using FIG. 4. Of course, each of the block data stream includes block header 301 and image data 300 as shown in FIG. 3.

Figure 6:
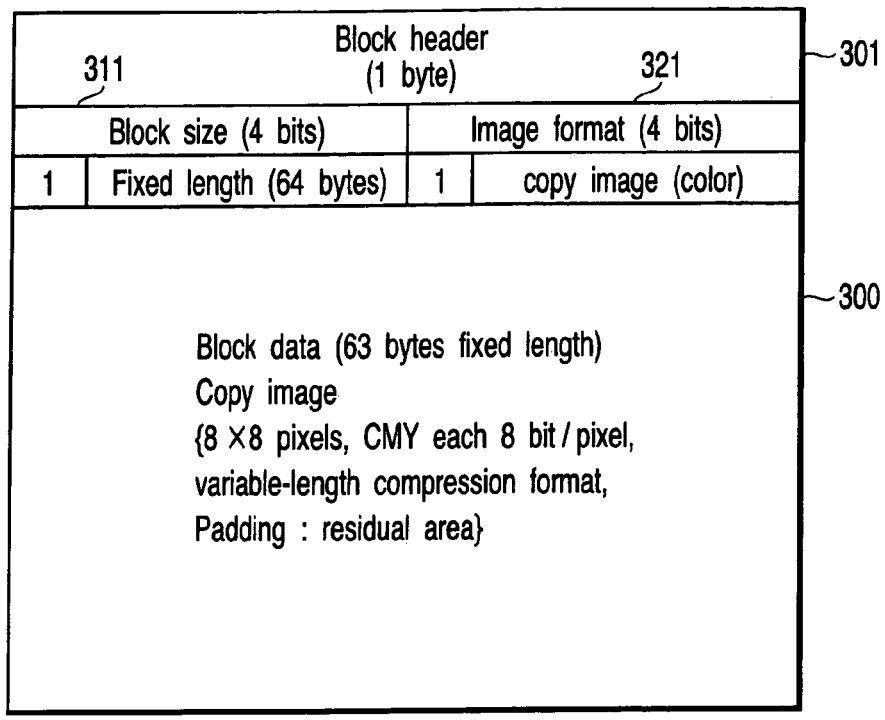
FIG. 6 is a schematic view to explain a color copy image of block image data.
Figure 7:
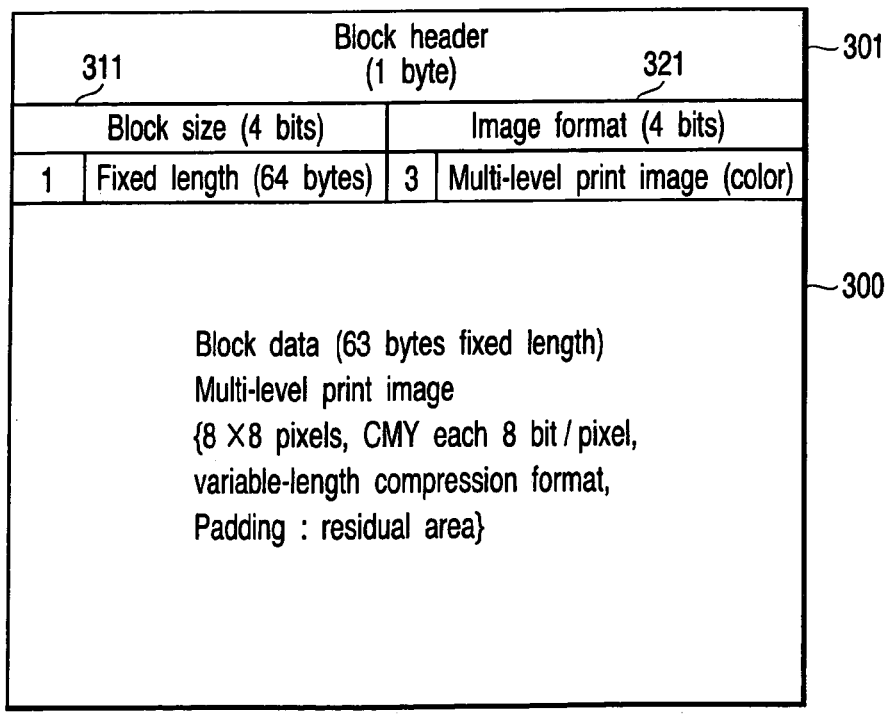
FIG. 7 is a schematic view to explain a color multi-level print image of block image data.
Figure 8:
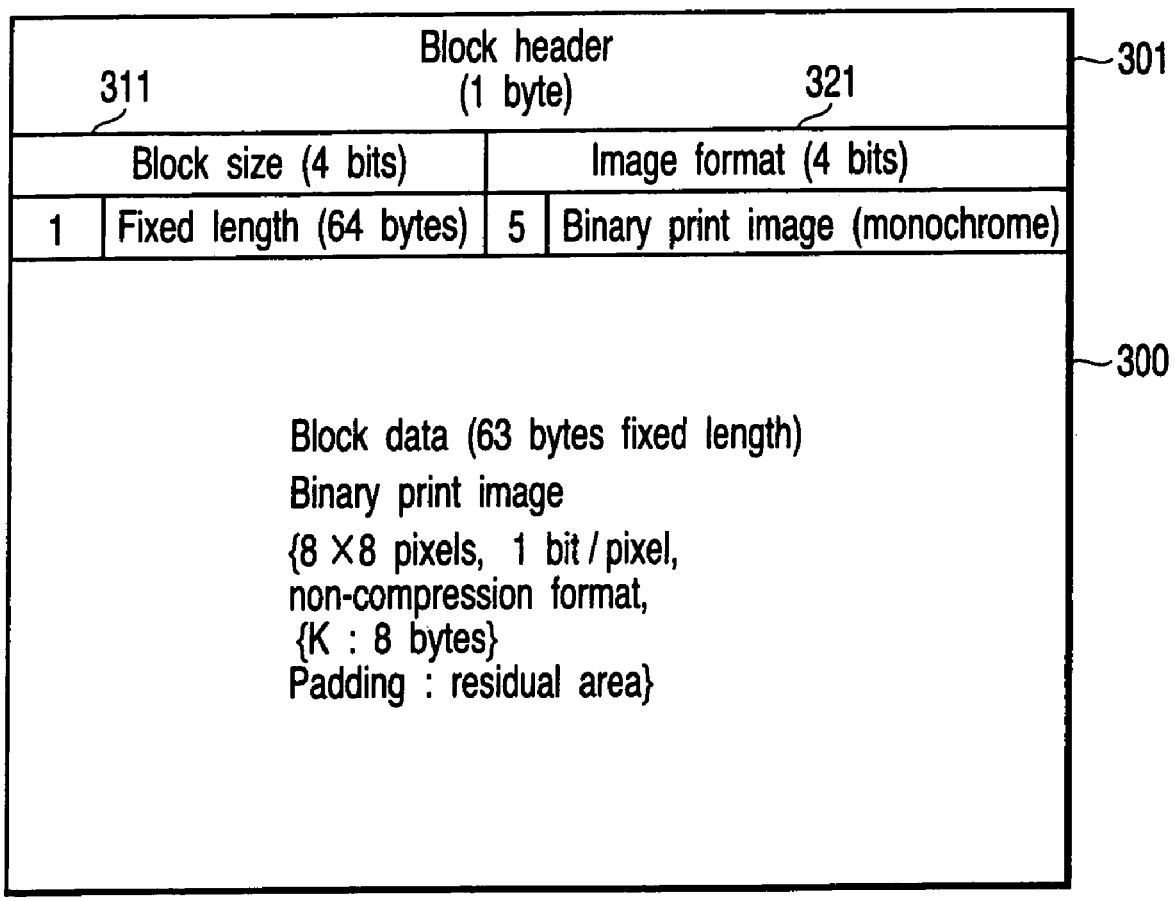
FIG. 8 is a schematic view to explain a monochrome binary print image of block image data.

More specifically, the fixed-length data has various attribute informations (block header 301) such as non-compression (compression or not), kind of coding and pixel direction in block (rotation direction in reading) and image data (data area 300). The image data is classified as shown in FIGS. 6 to 8 depending on the image characteristic.

As described in FIGS. 2, 4 and 9, the block image in the page memory (image memory) is synthesized at a unit of block, and read in a predetermined sequence (e.g., if rotation is required, the read sequence is changed as shown in FIG. 9). Image data of each block (block image data) is converted (subjected to image processing) according to an attribute specified very block.

Synthesized image data equivalent to printout one page by printer unit 4 is decomposed and/or converted in its data format every block to obtain printout by printer unit 4 (to obtain common format in the same page) as the need arises. For example, the image data is converted from CMY data into CMYK data, or converted from 1-bit data into 24-bit data.

Conversion every block is made, and thereby, the image data is linked (synthesized) at a unit of block. Incidentally, the reason why the block is divided is because of dividing the image area equivalent to one page image printed out by one-time printout. Thus, high-resolution image data (e.g., monochrome binary 1200×1200 dpi) is mixed within a range having no need of changing the fixed-length data size defined in block division. Moreover, each block does not need to be a square. For example, considering the case of rotating and outputting an image, the square block serves to simplify data structure. From the same reason as above, it is preferable that the data size of each block is equal.

FIG. 6, FIG. 7 and FIG. 8 show block image data description of copy image, print image and barcode image, respectively (FIGS. 6 to 8 show a state that the "block header" shown in FIG. 3 is added to image data having different attribute (format)).

The copy image shown in FIG. 6 has the following data structure. Specifically, "block size is 63 (byte) fixed length" is described in the block size field 311 of the block header 301 while "copy image (color)" is described in the image format field 321. The image data 300 is image data (i.e., image data scanned by scanner 2 (copy image 501 of FIG. 2)) defined by "8×8 pixel", "CMY, each 8 (bits)/pixel" and "variable-length compression".

The print image shown in FIG. 7 has the following data structure. Specifically, "block size is 63 (byte) fixed length" is described in the block size field 311 of the block header 301 while "print image (color)" is described in the image format field 321. The image data 300 is image data (i.e., image data supplied from the HDD 8 or external device (print image 601 of FIG. 2)) defined by "8×8 pixel", "CMYK, each 8 (bits)/pixel" and "variable-length compression".

The barcode image shown in FIG. 8 has the following data structure. Specifically, "block size is 63 (byte) fixed length" is described in the block size field 311 of the block header 301 while "barcode image (monochrome)" is described in the image format field 321. The image data 300 is image data (i.e., image data supplied from the HDD 8 or RAM 15 (barcode image 701 of FIG. 2)) defined by "8×8 pixel", "1 (bit)/pixel" and "K, 8 (byte) non-compression".

Figure 10:
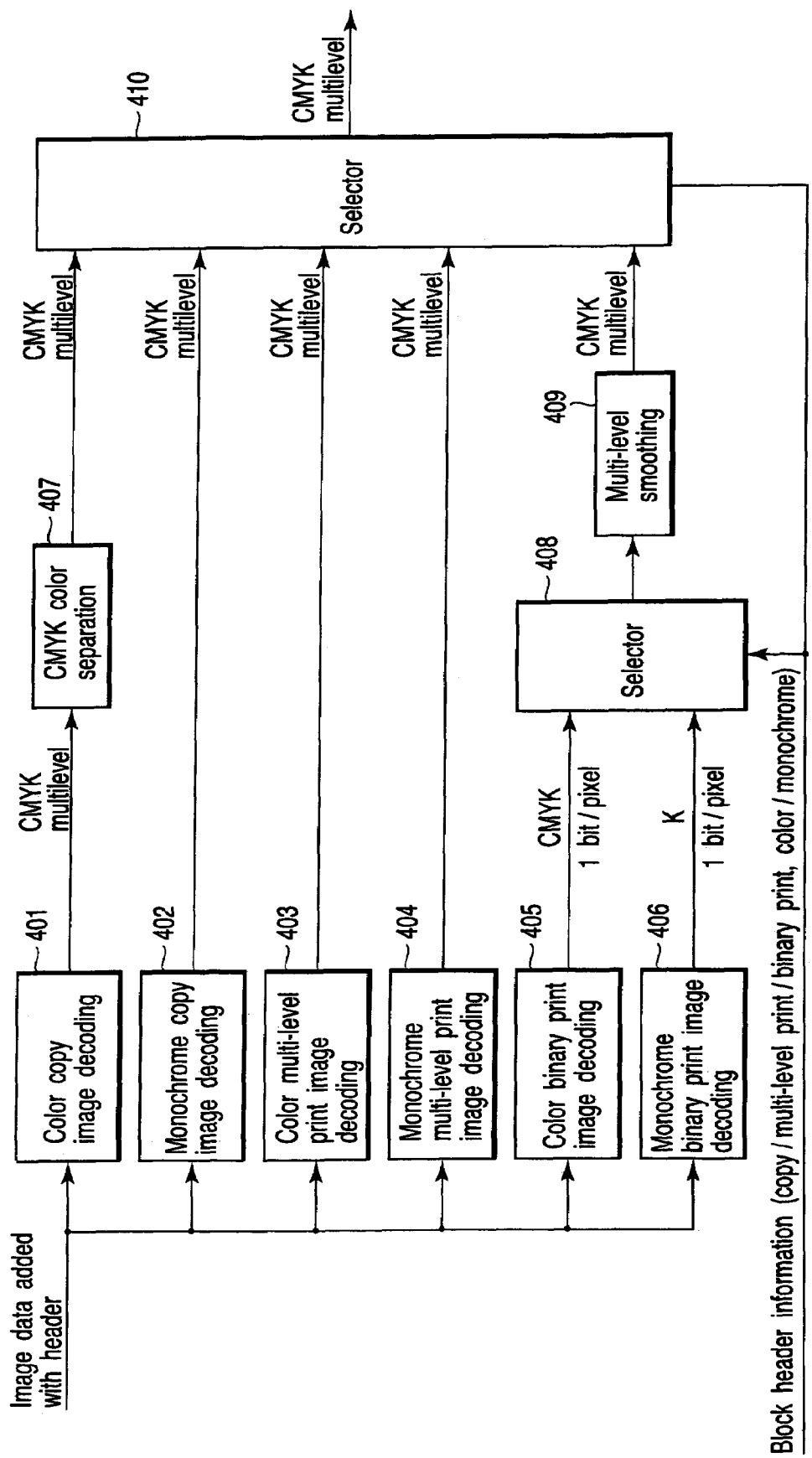
FIG. 10 is a block diagram to schematically explain the configuration of a printer image processing (unit) for selecting (executing) image processing based on attribute information of block image data.

FIG. 10 shows the configuration of the printer image processing circuit described using FIG. 2.

The printer image processing circuit 400 has several image processing units 401 to 406. The image processing units 401 to 406 decode supplied image data into printout (finally, four colors, that CMYK multi-level data) via the printer image processing unit 41 of the printer unit 4.

As already described in FIG. 3, the image data added with "block header 301" from the image memory 1101 is input to image processing units (coding units) 401 to 406 corresponding to individual image formats.

For example, multi-level color image data of copy image is decompressed (decoded) via the color copy image decoding unit 401, and thereafter, output as CMY multi-level data. The image data decoded (decompressed) by the color copy image decoding unit 401 is separated into four, that is, CMYK multi-level data usable for printout by the printer unit 4 via a CMYK color separation unit 407.

For example, monochrome image data (multi-level) of copy image is decompressed (decoded) via the monochrome copy image decoding unit 402, and thereafter, output as K (Black) multi-level data.

Likewise, multi-level color image data of print image is decompressed (decoded) via the color multi-level print image decoding unit 403, and thereafter, output as CMYK multi-level data (initial image data is CMYK; therefore, a device equivalent to the color separation unit 407 is not required).

Moreover, multi-level color (monochrome?) image data of print image is decompressed (decoded) via the monochrome multi-level print image decoding unit 404, and thereafter, output as K (Black) multi-level data.

On the other hand, binary color print image data (e.g., logo mark(s) and/or water mark(s)) is output as binary data defined by CMYK via the color binary print image decoding unit 405 (initial image data is non-compression data; therefore, no decompression is required).

Moreover, binary monochrome print image data (e.g., barcode data, etc.) is output as K (black) binary data via the monochrome binary print image decoding unit 406 (initial image data is non-compression data; therefore, no decompression is required).

Incidentally, the output from the color binary print image decoding unit 405 or the monochrome binary print image decoding unit 406 is input to a multi-level smoothing circuit 409. In this case, a selector 408 operates, that is, selects the corresponding image format based on the block header information 301 from the header analysis circuit 420.

The (binary) image data output from the selector 408 is smoothed into a continuous multi-level image via the multi-level smoothing circuit 409. Therefore, gradation of binary image data is smoothly converted via the multi-level smoothing circuit 409.

Image data processed every format is selected via a selector 410 based on the block header information 301 from the header analysis circuit 420. Thus, CMYK multi-level image data to be finally transferred to the printer unit 4 is selected (specified). In this case, the selector 410 executes build-up processing (expansion to raster data) to raster sequential image data so that the printer unit 4 can print out image data generated at a unit of block. Thereafter, the image data output from the selector 410 is input from the printer video interface 430 (see FIG. 2) to the image processing unit 41 of the printer unit 4. Then, the printer unit 4 executes printout γ correction, printout color correction, gradation correction, image synthesis and processing so that the image data is printable out.

The function of a digital multi-function printer using image edit mixing different formats shown in FIGS. 1, 2 and 4 will be explained below.

Figure 11:
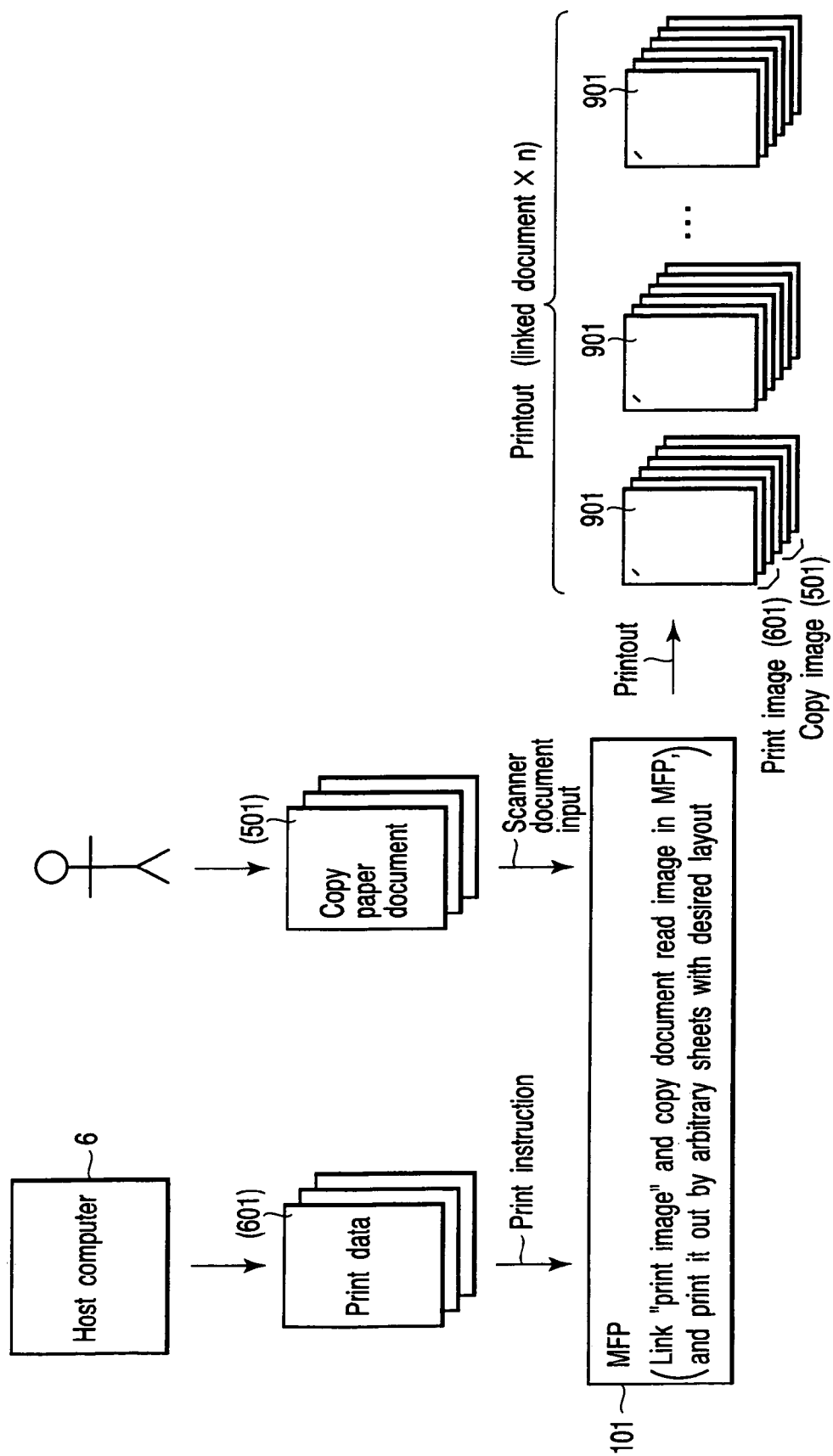
FIG. 11 is a schematic view to explain the concept of image output using a document link function of a digital multi-function printer.

FIG. 11 shows the operation of linking together (page editing) print data and an image in the digital multi-function peripheral (MFP), and obtaining the arbitrary sheet of printouts in a state of giving a desired layout and additional information. In this case, the print data is supplied from the host computer (see FIG. 1); on the other hand, the image is scanned as paper document by the scanner (see FIG. 1). For example, FIG. 11 schematically shows that n link documents (printouts) 901 stapled by the MFP having a staple function are obtained from print data input from the host computer and copy image (data) scanned by the scanner unit 2.

Figure 12:
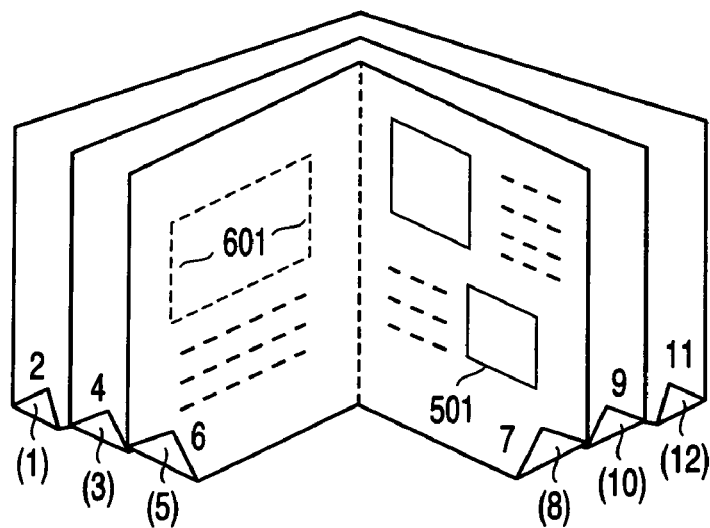
FIG. 12 is a schematic view to explain the concept of image output using a saddle stitching print function of a digital multi-function printer.

FIG. 12 shows an example in which print image and copy image are allocated in a double-page spread state in page editing (link print), and further, their image data are output on right and left on one page by saddle stitching (stitching the center fold using wire or string). According to the example shown in FIG. 12, three papers are assumed as being folded at the center, and print image 601 and/or copy image 501 equivalent to one page are arranged every half side. Likewise, print image 601 and/or copy image 501 are arranged on the backside of paper. In FIG. 12, numerals such as "(nm)" denote backside pages.

Figure 13:
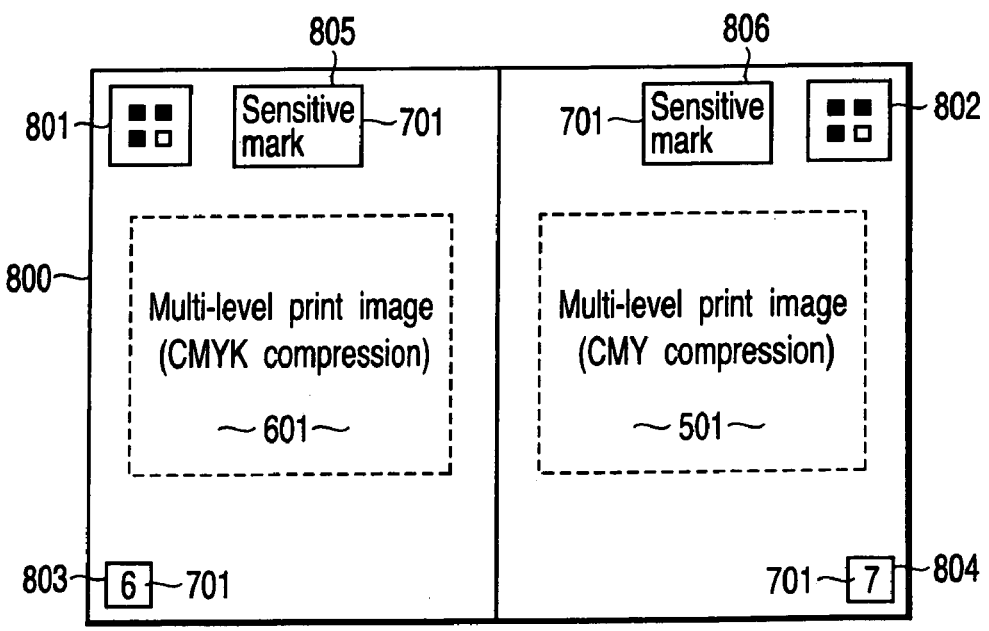
FIG. 13 is a schematic view to explain image output applied different image format page allocation to the image output using the saddle stitching print function.

FIG. 13 shows an example in which additional information other than page information is added in addition to image data allocation for the saddle stitching shown in FIG. 12.

According to the example shown in FIG. 13, multi-level print image (601, see FIG. 2) and copy image (501, see FIG. 2) are allocated every half side. Further, barcode images 801, 802 as monochrome binary image data (701, see FIG. 2), page number images 803, 804, and color binary image data; for example red characters "secret mark(s)=(sensitive mark)" logs 805, 806 are added.

The additional information is generated using low processing capacity (memory occupation and/or processing speed) as compared with multi-level printer image required for image generation for binary image data.

As shown in FIGS. 12 and 13, print data and scanner input data are once captured in the HDD 8 of the multi-functional peripheral 101. By doing so, complicate printout including several block image data having different image format are allocated.

As described above, apparatus/method for image processing (and image forming apparatus) of the present invention have the following features.

Specifically, image data having different characteristics, such as copy, printer, fax, barcode (log mark(s)) handling by the digital multi-function printer is divided into several blocks. Thereafter, attribute information containing the kind of image is added to the block-divided image data at a unit of block.

The block-divided image data is handled according to different format such as compression method and image format suitable for each image data. Therefore, when printout is again built up based on image data after page editing, optimum image processing is possible every block according to the attribute information.

By doing so, image data having different format are edited with free layout of mixing them in the same page without losing characteristic of the initial image.

Moreover, it is possible to provide apparatus and method for image processing, which can prevent an increase of image memory required for page editing.

Specifically, the page editing function of the present invention is used ("image data having different format are edited with free layout of mixing them in the same page without losing characteristic of the initial image"). By doing so, image data having different format is allocated to arbitrary position on image memory every unit image data (unit block data). As a result, image processing corresponding to each format is independently carried out every image data of unit block. Therefore, the quality of printout(s) output from the printer unit is improved (high quality printout is obtained).

The foregoing embodiment has described the case where printout from the output device is given as a typical example; however, the present invention is not limited to the printout. According to the present invention, various images having different format are handled with respect to various image output such as display, storage, fax transmission and reception, mail transmission and reception, in a state of mixing them without losing the characteristic. Of course, the present invention is applicable to an image forming apparatus, which can achieve various image editing and converts image data into image format suitable to image output.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:
a first input unit configured to input first image data;
a second input unit configured to input second image data;
an adding unit configured to divide each of the input first and second image data into several blocks, and add attribute data showing an attribute to each of the input first and second image data to each block;
a storage unit configured to store the first and second image data to which the attribute data is added;
an editing unit configured to read the stored first and second image data, perform layout editing to mix and lay out the first and second image data in one page, and cause the storage unit to store the first and second image data again;
a read unit configured to read, per block, the first and second image data laid out in one page, stored in the storage unit and added with the attribute data;
an analysis unit configured to analyze an attribute of each block based on each attribute data of the first and second image data read per block by the read unit;
an image processing unit configured to carry out first image processing with respect to the block of the first image data read by the read unit while carrying out second image processing with respect to the block of the second image data read by the read unit in accordance with each of the analyzed attributes; and
a synthesis unit configured to synthesize the image-processed blocks of the first and second image data into one page.

2. The image processing apparatus according to claim 1, wherein the first and second image data stored in the storage unit and added with the attribute data at a unit of the block have an amount of data equal to each other.

3. The image processing apparatus according to claim 1, wherein the blocks have an equal image area.

4. The image processing apparatus according to claim 1, wherein the image processing unit selects the first or second image processing in accordance with the analyzed attribute.

5. The image processing apparatus according to claim 4, wherein the first and second image data stored in the storage unit and added with the attribute data at a unit of the block have an amount of data equal to each other.

6. The image processing apparatus according to claim 4, wherein the blocks have an equal image area.

7. The image processing apparatus according to claim 4, wherein the image processing unit generates continuous raster data from the result of the first and second image processings carried out at a unit of block.

8. The image processing apparatus according to claim 1, wherein the image processing unit generates continuous raster data from the result of the first and second image processings carried out at a unit of block.

9. An image processing method, comprising:
inputting first image data;
inputting second image data;
dividing each of the input first and second image data into several blocks, and adding attribute data showing an attribute to each of the input first and second image data to each block;
storing the first and second image data to which the attribute data is added;
reading the stored first and second image data to perform layout editing to mix and lay out the first and second image data in one page, and storing the first and second image data again;
reading, per block, the stored first and second image data laid out in one page and added with the attribute data;
analyzing an attribute of each block based on each attribute data of the first and second image data read per block;
carrying out first image processing with respect to the readout block of the first image data while carrying out second image processing with respect to the readout block of the second image data in accordance with each of the analyzed attributes; and
synthesizing the image-processed blocks of the first and second image data into one page.

10. The image processing method according to claim 9, wherein the blocks have an amount of data equal to each other.

11. The image processing method according to claim 9, wherein the blocks have an equal image area.

12. An image forming apparatus, comprising:
- a first image processing unit configured to process an image according to a predetermined first image format, the first image format being added as attribute information to block data which employs an arbitrary number of pixels as a unit;
- a second image processing unit configured to process an image according to a predetermined second image format, the second image format being added as attribute information to a block data which employs an arbitrary number of pixels as a unit;
- an image attribute information identifying unit configured to read, with respect to input block data mixed and laid out with other input block data in one page, the attribute information added to the input block data, to direct the input block data to one of the first or second image processing units; and
- an image data synthesis unit configured to convert the block data processed by each image processing unit to have a format for an image output device.

* * * * *